US008121883B2

(12) United States Patent
Johnson et al.

(10) Patent No.: US 8,121,883 B2
(45) Date of Patent: Feb. 21, 2012

(54) METHOD AND SYSTEM FOR AUTOMATICALLY PRIORITIZING OPPORTUNITY BASED CUSTOMER REQUIREMENTS

(75) Inventors: Charles C. Johnson, Yorktown Heights, NY (US); Michael Allan Nelsen, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1003 days.

(21) Appl. No.: 12/027,328

(22) Filed: Feb. 7, 2008

(65) Prior Publication Data

US 2009/0204459 A1    Aug. 13, 2009

(51) Int. Cl.
*G06Q 10/00* (2006.01)
(52) U.S. Cl. .............. 705/7.27; 705/7.11; 705/7.12; 705/7.22; 705/7.25; 705/301; 705/348
(58) Field of Classification Search .............. 705/7.27
See application file for complete search history.

(56) References Cited

U.S. PATENT DOCUMENTS

| | | | |
|---|---|---|---|
| 5,734,890 A | 3/1998 | Case et al. | |
| 5,963,910 A | 10/1999 | Ulwick | |
| 6,115,691 A | 9/2000 | Ulwick | |
| 6,377,546 B1 | 4/2002 | Guerin et al. | |
| 7,165,041 B1 * | 1/2007 | Guheen et al. | 705/10 |
| 2009/0234710 A1 * | 9/2009 | Belgaied Hassine et al. | 705/10 |

FOREIGN PATENT DOCUMENTS

JP        2003076823 A  *  3/2003

OTHER PUBLICATIONS

Zhao, et al.; Temporal Workflow Management in a Claim Handling System; Proceedings of the international joint conference on Work activities coordination and collaboration 1999, San Francisco, California, United States; pp. 187-195. Retrieved from IDS.*
Grosof, et al.; A Declarative Approach to Business Rues in Contracts: Courteous Logic Programs in XML; Poceedings of the 1st ACM conference on Electronic Commerce, Denver, Colorado, United States 1999; 10 pages.
Zhao, et al.; Temporal Workflow Management in a Claim Handling System; Proceedings of the international joint conference on Work activities coordination and collaboration 1999, San Francisco, California, United States; pp. 187-195.

(Continued)

*Primary Examiner* — James A Reagan
(74) *Attorney, Agent, or Firm* — Schmeiser, Olsen & Watts; William Schiesser (57) ABSTRACT

A method and system for automatically prioritizing a plurality of customer requirements. A request for fulfilling a product-modifying customer requirement is received. Prioritization data associated with the customer requirement is obtained. The prioritization data includes revenue opportunity sizes, time constraints, the request's age, and indications of whether the product requires an operating system included in a predefined strategic operating system list and whether revenue associated with a business opportunity is lost if the request is rejected. Component scores for customer requirement-related variables are determined by evaluating formulas that include the variables. Evaluating the formulas includes applying weights to the variables and substituting the prioritization data for the variables. A priority score for prioritizing the customer requirement relative to other customer requirements is automatically determined by summing the component scores.

14 Claims, 8 Drawing Sheets

OTHER PUBLICATIONS

Avesani, et al.; Supporting the Requirements Prioritization Process. A Machine Learning approach. Proceedings of "16th International Conference on Software Engineering and Knowledge Engineering (SEKE 2004)", Banff, Alberta, Canada, Jun. 2004; KSI press; 6 pages.

Cleland-Huang et al.; Financially Informed Requirements Prioritization; ICSE '05, May 15-21, 2005, St. Louis, Missouri, USA; pp. 710-711.

Borland White Paper Apr. 2005; Mitigating Risk With Effective Requirements Engineering; Borland Software Corporation; 14 pages.

* cited by examiner

| COMPONENT SCORE FORMULA VARIABLE | HIGHER SCORE EFFECT | LOWER SCORE EFFECT |
|---|---|---|
| PRODUCT OPPORTUNITY SIZE | LARGER | SMALLER |
| TOTAL OPPORTUNITY SIZE | LARGER | SMALLER |
| AMOUNT OF TIME LEFT TO COMMIT | SMALLER | LARGER |
| OPPORTUNITY LOST IF REJECTED? | YES | NO |
| STRATEGIC OPERATING SYSTEM? | YES | NO |
| REQUEST AGE | OLDER | NEWER |
| AMOUNT OF TIME UNTIL PRODUCT INSTALLATION | SMALLER | LARGER |
| COST SIZING | SMALLER | LARGER |
| ODDS TO WIN | LARGER | SMALLER |
| USER-DEFINED ADJUSTMENT FACTOR | LARGER | SMALLER |

| COMPONENT SCORE FORMULA VARIABLE | COMPONENT SCORE FORMULA | COMMENTS/CONDITIONS ASSOCIATED WITH FORMULA |
|---|---|---|
| PRODUCT OPPORTUNITY SIZE | (PRODUCT OPPORTUNITY SIZE / NORMALIZATION FACTOR) * WEIGHT | |
| TOTAL OPPORTUNITY SIZE | (TOTAL OPPORTUNITY SIZE / NORMALIZATION FACTOR) * WEIGHT | |
| AMOUNT OF TIME LEFT TO COMMIT | (1/(AMOUNT OF TIME LEFT TO COMMIT / NORMALIZATION FACTOR)) * WEIGHT | IF NEGATIVE, SCORE IS ASSIGNED A PREDEFINED VALUE (E.G., 10) |
| OPPORTUNITY LOST IF REJECTED? | OPPORTUNITY LOST IF REJECTED VALUE * WEIGHT | IF OPPORTUNITY LOST IF REJECTED = YES, THEN VALUE = 1, ELSE VALUE = 0 |
| STRATEGIC OPERATING SYSTEM (OS)? | STRATEGIC OS VALUE * WEIGHT | IF STRATEGIC OS IS INCLUDED IN PREDEFINED LIST, THEN VALUE = 1, ELSE VALUE = 0 |
| REQUEST AGE | (REQUEST AGE / NORMALIZATION FACTOR) * WEIGHT | |
| AMOUNT OF TIME UNTIL PRODUCT INSTALLATION | (1/(AMOUNT OF TIME UNTIL PRODUCT INSTALLATION / NORMALIZATION FACTOR)) * WEIGHT | |
| COST SIZING | ((COST SIZING / NORMALIZATION FACTOR) * WEIGHT) * (-1) | |
| ODDS TO WIN | MULTIPLY ODDS BY SUM OF COMPONENT SCORES | |
| USER-DEFINED ADJUSTMENT FACTOR | USER-DEFINED ADJUSTMENT | RAW ADJUSTMENT IS ADDED TO TOTAL PRIORITY SCORE |

| COMPONENT SCORE FORMULA VARIABLE | SAMPLE DATA | NORMALIZATION FACTOR | WEIGHT | COMPONENT SCORE |
|---|---|---|---|---|
| PRODUCT OPPORTUNITY SIZE | 600 | 300 | 0.05 | 0.10 |
| TOTAL OPPORTUNITY SIZE | 800 | 400 | 0.2 | 0.40 |
| AMOUNT OF TIME LEFT TO COMMIT | 7 | 14 | 0.25 | 0.50 |
| OPPORTUNITY LOST IF REJECTED? | YES | NONE | 0.1 | 0.10 |
| STRATEGIC OPERATING SYSTEM? | YES | NONE | 0.1 | 0.10 |
| REQUEST AGE | 60 | 30 | 0.05 | 0.10 |
| AMOUNT OF TIME UNTIL PRODUCT INSTALLATION | 60 | 30 | 0.1 | 0.05 |
| COST SIZING | 12 | 25 | 0.15 | -0.072 |
| ODDS TO WIN | 100 | NONE | | 127.80 |
| USER-DEFINED ADJUSTMENT FACTOR | 1 | | | |
| PRIORITY SCORE: | | | | 128.80 |

| COMPONENT SCORE FORMULA VARIABLE | NORMALIZATION FORMULA |
|---|---|
| PRODUCT OPPORTUNITY SIZE | AVERAGE PRODUCT OPPORTUNITY SIZE / NORMALIZATION FACTOR = 1 |
| TOTAL OPPORTUNITY SIZE | AVERAGE TOTAL OPPORTUNITY SIZE / NORMALIZATION FACTOR = 1 |
| AMOUNT OF TIME LEFT TO COMMIT | AVERAGE AMOUNT OF TIME LEFT TO COMMIT / NORMALIZATION FACTOR = 1 |
| OPPORTUNITY LOST IF REJECTED? | NO NORMALIZATION FACTOR |
| STRATEGIC OPERATING SYSTEM? | NO NORMALIZATION FACTOR |
| REQUEST AGE | AVERAGE REQUEST AGE / NORMALIZATION FACTOR = 1 |
| AMOUNT OF TIME UNTIL PRODUCT INSTALLATION | AVERAGE AMOUNT OF TIME UNTIL PRODUCT INSTALLATION / NORMALIZATION FACTOR = 1 |
| COST SIZING | AVERAGE COST SIZING / NORMALIZATION FACTOR = 1 |

METHOD AND SYSTEM FOR AUTOMATICALLY PRIORITIZING OPPORTUNITY BASED CUSTOMER REQUIREMENTS

FIELD OF THE INVENTION

The present invention relates to a method and system for automatically prioritizing opportunity based customer requirements, and more particularly to a computer-implemented technique for automatically prioritizing customer requirements via priority scores that utilize normalization formulas and weighting factors.

BACKGROUND OF THE INVENTION

Conventionally, multiple requests (e.g., Requests for Price Quotations from a sales team) are fulfilled by test and development efforts according to a prioritization of customer requirements associated with each request. The prioritization of customer requirements includes a first come-first served approach and/or a subjective approach, such as a utilization of best practices and human judgment or a "squeaky wheel" scheme based on a particular person's or group's sponsorship of a request. These known customer requirement prioritization approaches provide an inefficient and ineffective deployment of resources for meeting customer requirements, especially in a high volume environment. In the case of the known subjective approaches, prioritization is inconsistently applied, thereby resulting in additional inefficiencies regarding resource deployment. Moreover, conventional customer requirement prioritization approaches hinder test and development teams from making complete and effective determinations of resource deployment costs. Thus, there exists a need to overcome at least one of the preceding deficiencies and limitations of the related art.

SUMMARY OF THE INVENTION

The present invention provides a computer-implemented method of automatically prioritizing a plurality of customer requirements, comprising:

receiving, by a computing unit, a request for fulfilling a customer requirement associated with a business opportunity, wherein the customer requirement includes one or more modifications to a product;

obtaining, by the computing unit, a set of prioritization data associated with the customer requirement, wherein the set of prioritization data includes a plurality of revenue opportunity sizes, a plurality of time constraints, an age of the request, an operating system value indicating whether the product requires an operating system included in a predefined list including a plurality of strategic operating systems, and an opportunity lost value indicating whether an amount of revenue associated with the business opportunity is lost if the request is rejected;

determining, by the computing unit, a plurality of component scores for a plurality of variables associated with the customer requirement, wherein the determining comprises evaluating a plurality of formulas that include the plurality of variables, and wherein the evaluating comprises applying a plurality of weights to the plurality of variables in a one-to-one correspondence and substituting the set of prioritization data for the plurality of variables; and automatically determining, by the computing unit, a priority score for prioritizing the customer requirement relative to a plurality of other customer requirements, wherein the automatically determining the priority score comprises determining a sum of the plurality of component scores.

A system, computer program product and a process for supporting computing infrastructure that provides at least one support service corresponding to the above-summarized method are also described and claimed herein.

Advantageously, the present invention provides a technique for automatically prioritizing opportunity based customer requirements via a technique that eliminates or decreases guesswork related to selecting which customer requirement requests are queued with highest priority. Further, the present invention ranks customer requirements so that the effort expended in fulfilling a request for a customer requirement is aligned with a business value realized by fulfilling the request.

DETAILED DESCRIPTION OF THE INVENTION

Overview

The present invention provides a technique for automatically prioritizing opportunity based customer requirements, which are associated with requests to fulfill the customer requirements. The prioritization technique disclosed herein determines customer requirement priority scores using priority score formulas that utilize normalization and weighting methods. The normalization method is performed across disparate, unassociated factors to equalize the factors, where the factors are associated with customer requirements. The weighting method is utilized to set business priority between the factors. The factors utilized by the disclosed technique include, but are not limited to, return on investment factors. The factors also include time-based factors, Boolean factors and adjustments based on human judgment. The priority scores rank opportunity based customer requirements.

As used herein, an opportunity based customer requirement is defined as a description of one or more modifications and/or one or more additions to the functional capabilities of a product, such as a hardware product for a computing system or a computing device. An opportunity based customer requirement is a requirement desired by a customer and is associated with a request such as a Request for Price Quotation (RPQ), where fulfilling the request provides a revenue opportunity. In one embodiment, RPQs are received by a test and development team from a sales team. An opportunity based customer requirement is also referred to herein simply as a customer requirement. As used herein, an action of fulfilling a customer requirement is equivalent to fulfilling a request associated with the customer requirement.

Customer Requirements Prioritization System

Figure 1:
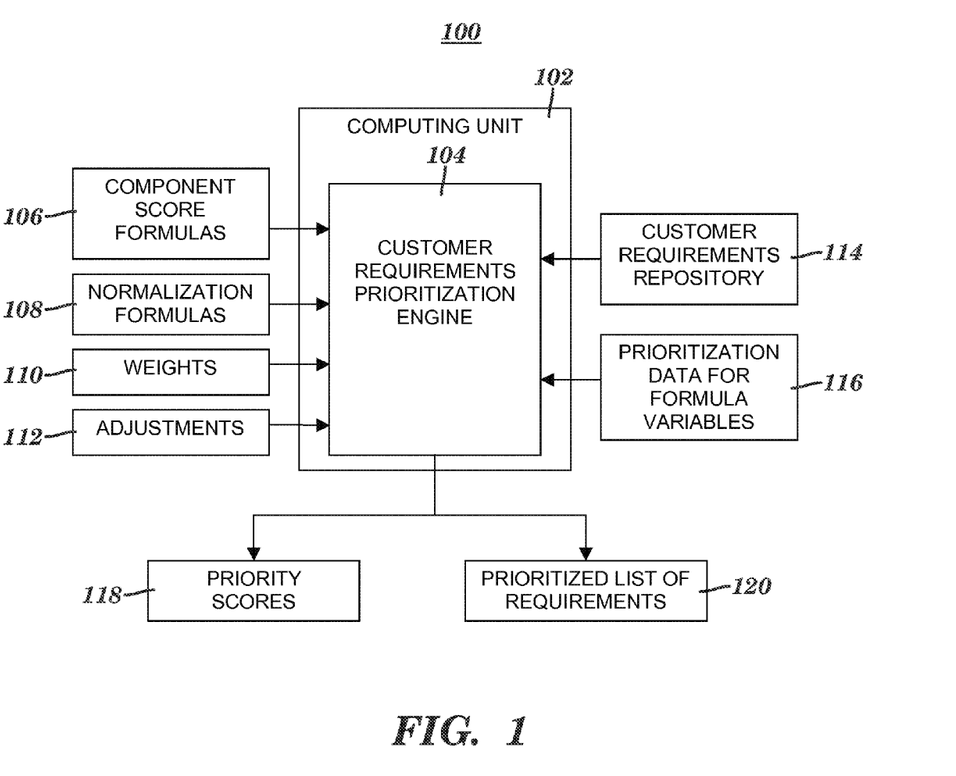
FIG. 1 is a block diagram of a system for automatically prioritizing opportunity based customer requirements, in accordance with embodiments of the present invention.

FIG. 1 is a block diagram of a system for automatically prioritizing opportunity based customer requirements, in accordance with embodiments of the present invention. System 100 includes a computing unit 102 that includes a customer requirements prioritization engine 104. System 100 also includes inputs to engine 104 that include component score formulas 106, normalization formulas 108, weights 110, adjustments 112, customer requirements from a customer requirements repository 114 and prioritization data 116 used as values of variables in component score formulas 106. Furthermore, system 100 includes output from engine 104 that includes priority scores 118 and a prioritized list of customer requirements 120.

Component score formulas 106 are utilized to determine component scores for a set of predefined variables associated with a customer and a revenue opportunity. Normalization formulas 108 determine normalization factors that are utilized in component score formulas 106. Weights 110 are applied in component score formulas 106 to designate the relative importance of each of the aforementioned predefined variables. Adjustments 112 are one or more optional user-defined adjustment factors that are applied to priority scores determined by engine 104 using customer requirements from repository 114. Prioritization data 116 includes a name of a product to be supplied to a customer, an product installation date desired by the customer, a product opportunity size, a total opportunity size, an amount of time (e.g., days) left to commit, a value indicating whether a revenue opportunity is lost if the associated request to fulfill a customer requirement is rejected, a value indicating whether the product requires a strategic operating system (OS), an age of the request, an amount of time until a product installation (e.g., product installation date), a cost sizing, odds to win a bid for fulfilling the customer requirement, and a user-defined, manually input adjustment factor. To avoid skewed results derived from component score formulas 106, the monetary-based variables (i.e., product opportunity size, total opportunity size and cost sizing) in prioritization data 116 are expressed in terms of the same monetary unit (e.g., all of the aforementioned monetary-based variables are expressed in terms of thousands of dollars). Similarly, the time-based variables (i.e., amount of time left to commit, request age, and amount of time until a product installation) in prioritization data 116 are expressed in terms of the same time-based unit of measure (e.g., all of the aforementioned time-based variables are expressed in terms of days). The functionality of the aforementioned components of system 100 is described in more detail below relative to FIGS. 2 & 3.

Computing unit 102 is a computer that operates, for example, as a standalone computing system or as a client or server in a client-server computing environment. Repository 114 is, for instance, a Lotus® Notes® database.

Customer Requirements Prioritization Process

Figure 2:
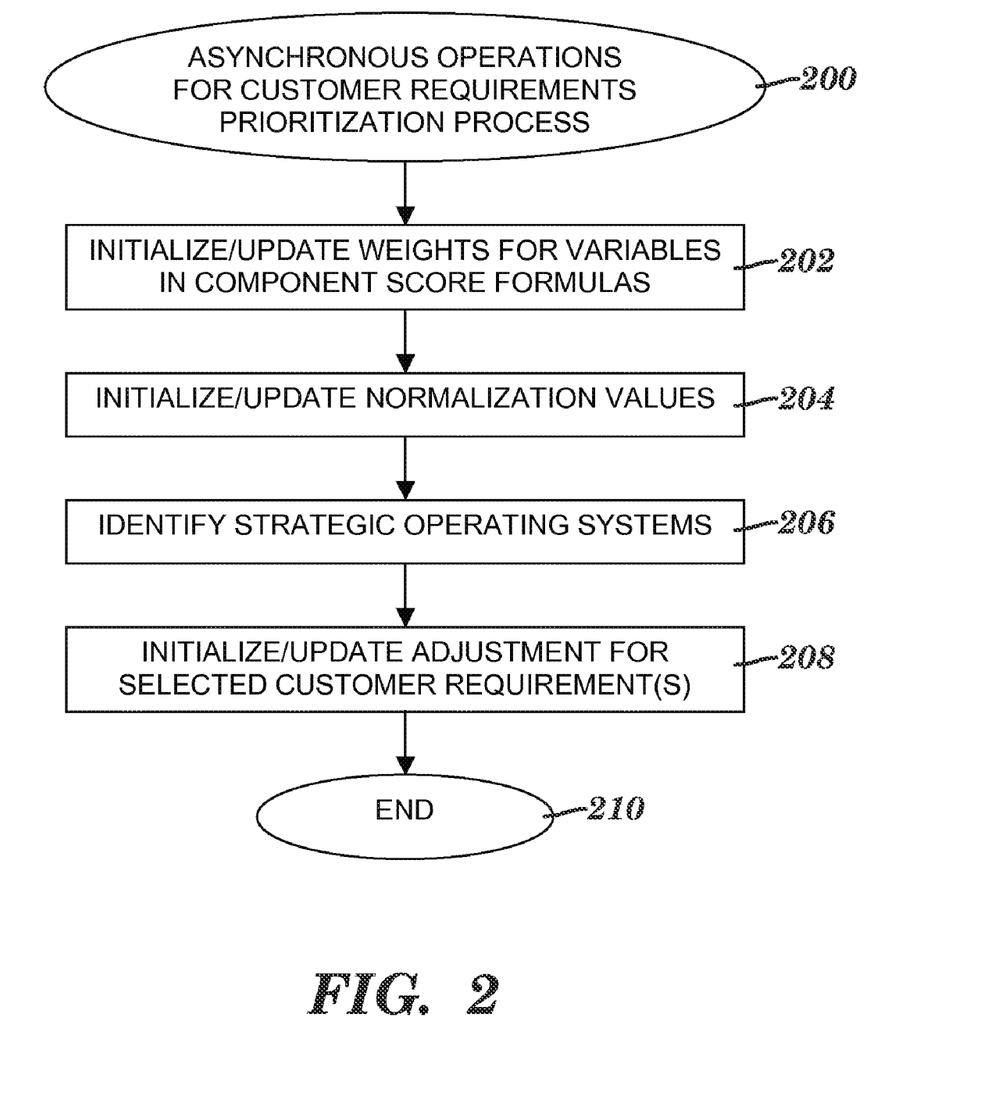
FIG. 2 is a flow diagram of asynchronous operations used by a customer requirements prioritization process implemented by the system of FIG. 1, in accordance with embodiments of the present invention.

FIG. 2 is a flow diagram of asynchronous operations used by a customer requirements prioritization process implemented by the system of FIG. 1, in accordance with embodiments of the present invention. The asynchronous operation process of FIG. 2 starts at step 200. In step 202, weights 110 (see FIG. 1) that are applied to variables in component score formulas 106 (see FIG. 1) are initialized or updated. Weight updates performed in step 202 provide for administrative management of skewing of component score formula variables (hereinafter, also referred to simply as "variables") where external influences change the relative weight of certain variables over time (e.g., currency based variables which change due to inflation, pricing, etc.) while weights of other variables are held constant (e.g., time based variables).

In step 204, normalization values (a.k.a. normalization factors) determined by normalization formulas 108 (see FIG. 1) are initialized or updated. In step 206, strategic operating systems are identified and stored (e.g., in a repository coupled to computing unit 102 of FIG. 1) so that any component score formula 106 (see FIG. 1) that depends upon identifying whether an operating system required for a revenue opportunity is strategic or not utilizes the strategic operating systems identified in step 206. In optional step 208, a manually input, user-defined adjustment for a priority score of a selected customer requirement is initialized or updated. Step 208 is repeated for other customer requirements if the priority scores for the other customer requirements require an adjustment. The steps of 202, 204, 206 and 208 may be performed in any order. The process of FIG. 2 ends at step 210.

An administrator or other user of system 100 (see FIG. 1) performs steps 202, 204 and 206 asynchronously to the automatic prioritization process of FIG. 3, which is described below. Furthermore, step 208 is performed asynchronously to the process of FIG. 3 by, for example, a member of a sales team or another user of system 100 (see FIG. 1).

Figure 3:
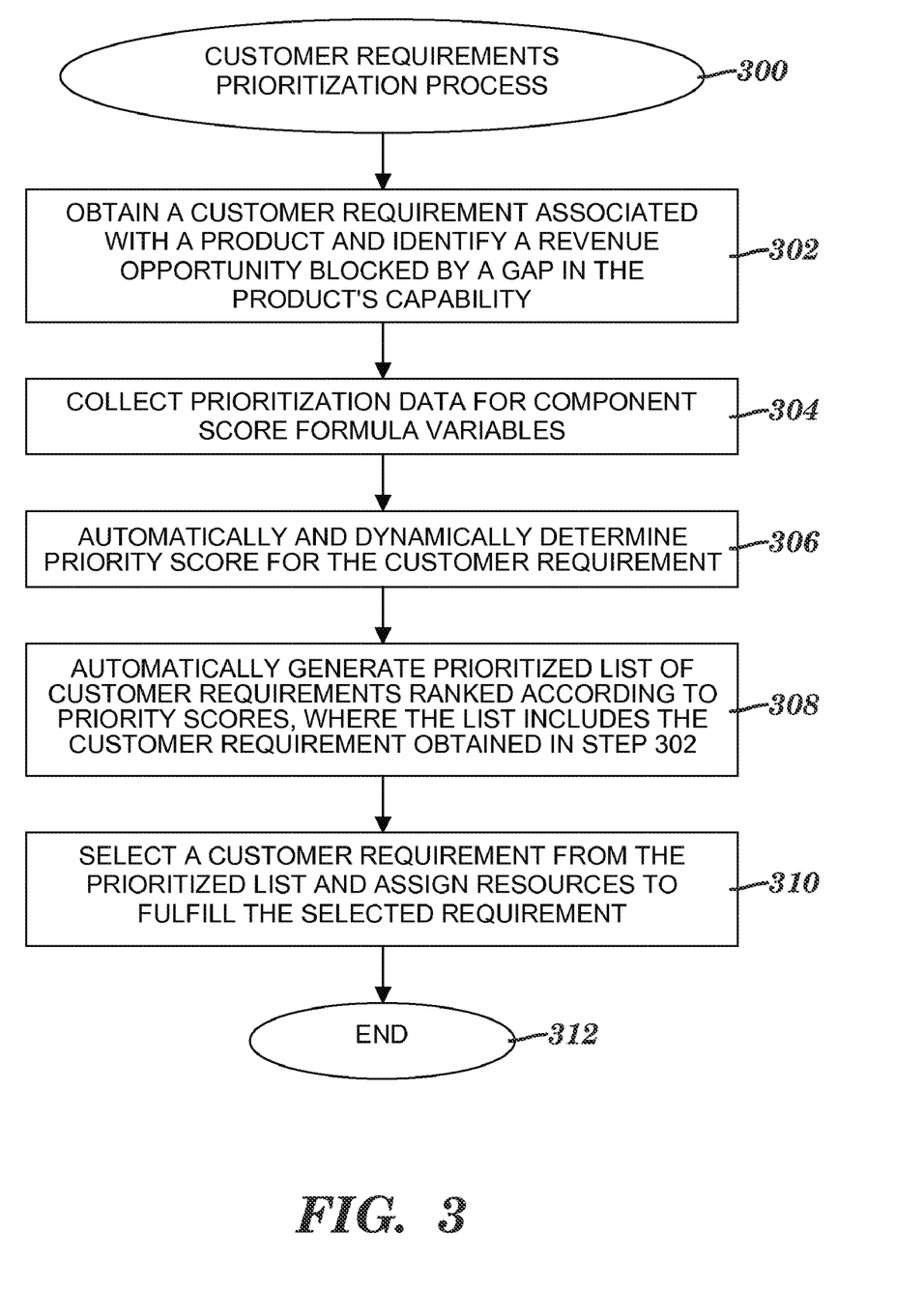
FIG. 3 is a flow diagram of a customer requirements prioritization process that uses the operations of FIG. 2 and that is implemented by the system of FIG. 1, in accordance with embodiments of the present invention.

FIG. 3 is a flow diagram of a customer requirements prioritization process that uses the operations of FIG. 2 and that is implemented by the system of FIG. 1, in accordance with embodiments of the present invention. The customer requirements prioritization process begins at step 300. In step 302, customer requirements prioritization engine 104 (see FIG. 1) obtains a customer requirement from repository 114 (see FIG. 1). The customer requirement obtained in step 302 identifies one or more modifications that a product requires because of an identified gap in the product's capability.

In step 304, customer requirements prioritization engine 104 (see FIG. 1) collects prioritization data 116 (see FIG. 1) associated with variables of component score formulas 106 (see FIG. 1).

In step 306, engine 104 (see FIG. 1) substitutes values from the collected prioritization data for the associated variables of component score formulas 106 (see FIG. 1) and evaluates the component score formulas using weights input in step 202 (see FIG. 2) and normalization factors input in step 204 (see FIG. 2). Normalization factors are used in step 306 to prevent external influences from skewing relative weights of component score formula variables, to prevent price differences between products from skewing priorities towards higher priced products, to allow for differences in length of sales cycle or time it takes to implement the requirement for various products being prioritized in a relative group, and to allow the value of all component score formula variables to start out having equal weight, before the weights 110 (see FIG. 1) are applied. As one example of the skewing being avoided by normalization, consider that an average deal size increases each year due to inflation, improved clothing rates, etc., with all other component score formula variables being equal. In this case, as the average deal size increases, the relative impact on the priority score increases.

Engine 104 (see FIG. 1) also dynamically and automatically determines a total priority score in step 306 for the customer requirement obtained in step 302 by following these steps: (1) adding the results of the evaluated component score formulas to determine a sum; (2) optionally multiplying a value of an odds to win variable by the sum to obtain a priority score; and (3) optionally adjusting the obtained priority score by a user-defined adjustment factor to determine the total priority score (e.g., by adding the adjustment factor to the obtained priority score). If there is no adjustment factor associated with the customer requirement obtained in step 302, then the priority score obtained after multiplying the odds to win by the sum of the evaluated component score formulas is the total priority score for the obtained customer requirement. Step 306 is performed dynamically in response to any updates performed in the process of FIG. 2, in response to any update of prioritization data 116 (see FIG. 1) that is used as a value of a component score formula variable or in response to passage of time on a daily interval. Step 306 is performed by engine 104 (see FIG. 1) executing, for instance, Microsoft® Excel® commands.

In step 308, customer requirements prioritization engine 104 (see FIG. 1) dynamically and automatically generates a prioritized list of customer requirements that ranks the customer requirement obtained in step 302 relative to other customer requirements according to the priority score determined in step 306 and other priority scores determined for the other customer requirements in other, previous executions of the process of FIG. 3. For example, the prioritized list is generated and displayed in a highest to lowest priority score order. Step 308 is performed by engine 104 (see FIG. 1) executing, for instance, Microsoft® Excel® commands.

In step 310, a user (e.g., a project manager) selects a customer requirement from the prioritized list generated in step 308 based on the placement of the selected customer requirement in the list (i.e., based on the priority score of the customer requirement). For example, the user selects the customer requirement in the prioritized list that has the highest priority score. Also in step 310, resources (e.g., equipment and personnel resources) and funding are assigned to fulfill the selected customer requirement. The assignment of resources to the customer requirement having the highest priority score provides the most business-related benefits for the funds and resources expended in fulfilling the customer requirement. The particular customer requirement selected in step 310 is a definable, repeatable result of the customer requirement prioritization process of FIG. 3. The prioritization process of FIG. 3 ends at step 312.

In one embodiment, step 310 includes a test and development team identifying requests that have the highest priority scores on the prioritization list generated in step 308. The test and development team then determines for each of the identified requests whether or not to apply equipment and people resources during an upcoming testing phase.

Figure 4:
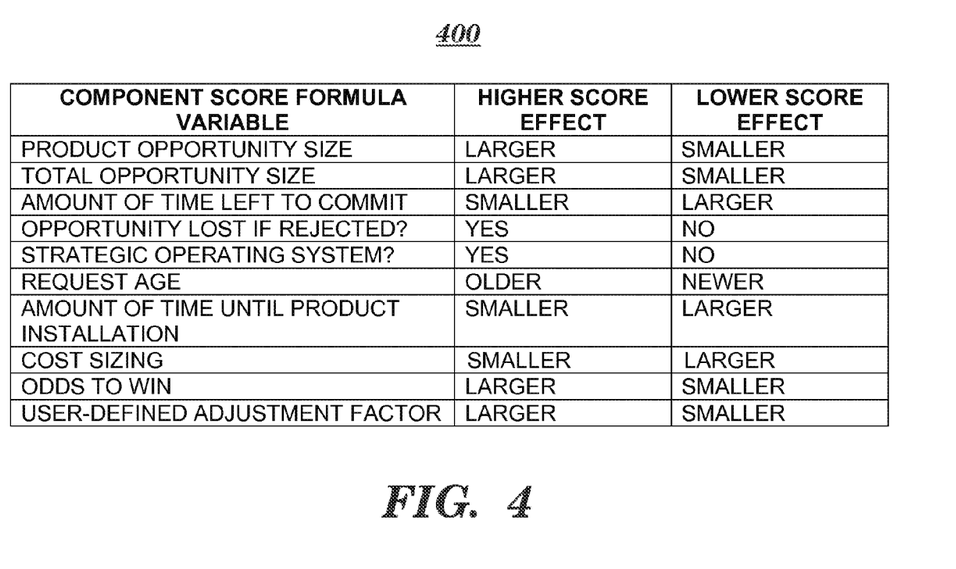
FIG. 4 is a table of variables used in component score formulas used in the system of FIG. 1 and scoring effects generated by varying values of the variables, in accordance with embodiments of the present invention.

FIG. 4 is a table 400 of variables used in component score formulas used in the system of FIG. 1 and scoring effects generated by varying values of the variables, in accordance with embodiments of the present invention. Each component score formula is used to generate a component score associated with a variable of a plurality of component score formula variables. The variable associated with a component score is referred to herein as an associated component variable. The generated component score is a component of a customer requirement's priority score determined in step 306 of FIG. 3. The variables and the scoring effects included in table 400 are described below. In each of the following descriptions of the component score formula variables, a reference to the customer requirement or customer's requirement refers to the customer requirement obtained in step 302 of FIG. 3.

Product opportunity size: An estimated amount of revenue (e.g., a dollar amount) to be realized as a result of providing to a customer the product whose functionality is modified and/or added to according to a customer requirement provided by the customer. A larger product opportunity size corresponds to a higher associated component score and a smaller product opportunity size corresponds to a lower associated component score.

Total opportunity size: An estimated amount of total revenue (e.g., a dollar amount), which includes the product opportunity size associated with a product and an estimated additional amount of revenue to be realized as a result of providing one or more other products to a customer, where the need for the one or more other products is driven by the customer's need for the product. For example, if the product opportunity size is an estimated amount of revenue from providing a SAN Volume Controller (SVC) engine to a customer, then total opportunity size includes the product opportunity size plus estimated revenue from sales of additional storage which is driven by the customer's need for the SVC engine. The SVC engine is offered by International Business Machines Corporation located in Armonk, N.Y. A larger total opportunity size corresponds to a higher associated component score and a smaller total opportunity size corresponds to a lower associated component score.

Amount of time left to commit: An amount of time (e.g., number of days) remaining before a commitment to fulfill the customer requirement must be delivered to the customer in order to preserve an ability to fulfill the customer requirement. For example, if the amount of time left to commit is 2 days, then the test and development team must commit to fulfilling the customer requirement within 2 days or the revenue opportunity will be lost. A smaller amount of time left to commit corresponds to a higher associated component score and a larger amount of time left to commit corresponds to a lower associated component score. It should be noted that the amount of time left to commit is distinguished from an amount of time left to deliver the product to the customer. In another embodiment, the amount of time left to deliver the product is added to table 400 as another component score formula variable.

Opportunity lost if rejected?: A Yes or No value that indicates whether the revenue opportunity for fulfilling the customer requirement sometime in the future is lost if the request for fulfilling the customer requirement is rejected. For example, if the revenue opportunity is lost if the request is rejected, then the value is 1 (i.e., a Yes value) and otherwise the value is 0 (i.e., a No value). The associated component score is higher if the opportunity lost if rejected value is Yes and lower if the value is No.

Strategic operating system?: A Yes or No value that indicates whether an operating system required by the product being modified by the customer requirement is included in a predefined list of strategic operating systems. Inclusion in the predefined strategic operating system list indicates that the product's operating system is one of a predefined set of standard operating systems that are, for example, commonly used by the test and development team that deploys resources for fulfilling the customer requirement. If the customer requirement describes a function that requires one of the predefined strategic operating systems, then the likelihood is high that that there are multiple requests for the same function and the likelihood is low that the required function is unique and requires customization work. Therefore, fulfilling a customer requirement associated with a standard operating system is a relatively easy task for the test and development team and is ranked higher, as opposed to fulfilling a customer requirement by building a customized function associated with a non-standard operating system, which is a relatively harder task that is ranked lower. For example, if the product's operating system is a standard operating system included in the predefined strategic operating system list, then the strategic operating system value is 1 (i.e., a Yes value), otherwise the value is 0 (i.e., a No value). The associated component score is higher if the strategic operating system value is Yes and lower if the value is No.

Request age: An age of the request for a fulfillment of the customer requirement, where the age is expressed in, for example, a number of days. The request is, for instance, an RPQ. An older (i.e., larger) request age corresponds to a higher associated component score and a newer (i.e., smaller) request age corresponds to a lower associated component score.

Amount of time left before product installation: An amount of time (e.g., number of days) remaining before an installation of the product whose functionality is modified and/or added to according to the customer requirement. A smaller amount of time left before the product installation corresponds to a higher associated component score and a larger amount of time left before the product installation corresponds to a lower associated component score.

Cost sizing: An estimate of a cost (e.g., a dollar amount) of a test for fulfilling the customer requirement and of related development work and software error fixes, where the test is performed by, for example, a test and development team. The cost sizing includes a cost of resources (e.g., equipment and/or personnel) required for the test (e.g., hardware rentals and short-term contractors needed for the test, travel costs, etc.). A smaller cost sizing corresponds to a higher associated component score and a larger cost sizing corresponds to a lower associated component score.

Odds to win: An odds value of winning a bid for fulfilling the customer requirement. The odds value is an estimate of the probability of winning the bid for fulfilling the customer requirement provided by, for example, a member of a sales team. A larger odds value corresponds to a higher priority score associated with the customer requirement and a smaller odds value corresponds to a lower priority score. For example, the odds to win value is determined by a sales team that is submitting the customer requirement to a test and development team.

User-defined adjustment factor: An optional user-defined adjustment value that is added to an initial priority score to generate a final priority score for the customer requirement. The initial priority score is generated by multiplying the odds value (e.g., expressed as a percentage) by a sum of all the component scores (e.g., the aforementioned associated component scores associated with product opportunity size, total opportunity size, amount of time left to commit, opportunity lost if rejected, strategic operating system, request age, amount of time left before product install date, and cost sizing). A larger user-defined adjustment factor corresponds to a higher priority score associated with the customer requirement and a smaller user-defined adjustment factor corresponds to a lower priority score. The user-defined adjustment factor is determined by, for example, a member of a sales team or an administrator of system 100 (see FIG. 1).

The formulas associated with each component score formula variable listed above are included in FIG. 5, which is described below.

Figure 5:
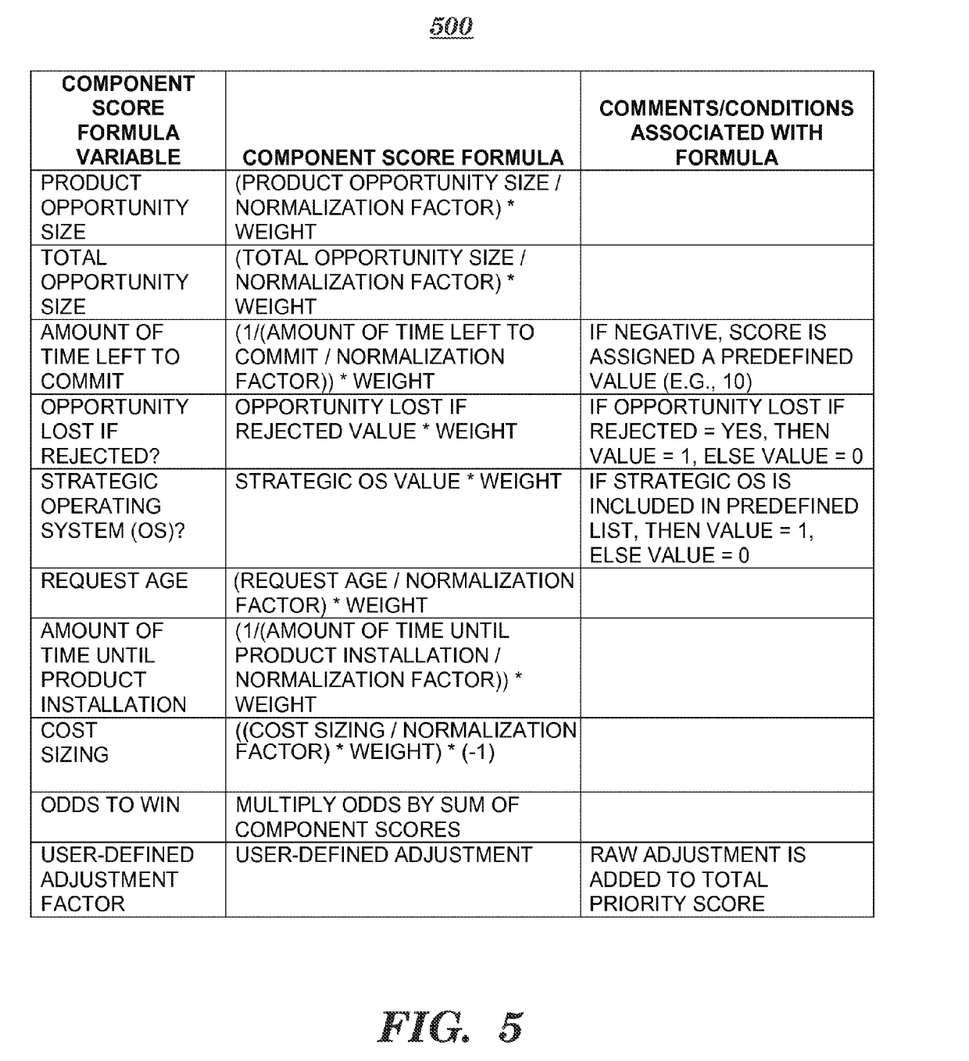
FIG. 5 is a table of component score formulas used in the system of FIG. 1 and in the process of FIG. 3, in accordance with embodiments of the present invention.

FIG. 5 is a table 500 of component score formulas used in the system of FIG. 1 and in the process of FIG. 3, in accordance with embodiments of the present invention. A component score is determined in step 306 (see FIG. 3) for each component score formula variable in the first column of table 500 by evaluating the corresponding component score formula in the second column of table 500. For example, a component score for the Product opportunity size variable is determined by evaluating the formula: (PRODUCT OPPORTUNITY SIZE/NORMALIZATION FACTOR)×WEIGHT. In the various formulas disclosed herein, the multiplication symbols of * and × are used interchangeably.

Examples of evaluating the component score formulas of table 500 are discussed below relative to FIG. 6. A condition in the third column of table 500 indicates that if the component score formula (1/(AMOUNT OF TIME LEFT TO COMMIT/NORMALIZATION FACTOR))×WEIGHT (i.e., the component score formula associated with the Amount of time left to commit variable) evaluates to a negative value, then the priority score for the Amount of time left to commit variable is set to a predefined value (e.g., a value of 10).

It should be noted that each occurrence of NORMALIZATION FACTOR and WEIGHT in the component score formula column of table 500 does not refer to the same normalization factor and the same weight. Rather, for a first group of component score formula variables that include Product opportunity size, Total opportunity size, Amount of time left to commit, Opportunity lost if rejected, Strategic operating system, Request age, Amount of time before product install date, and Cost sizing, the WEIGHT values occurring in component score formulas associated with the aforementioned first group of variables are associated with a plurality of weights in a one-to-one correspondence, where the plurality of weights are included in weights 110 (see FIG. 1). Moreover, for a second group of component score formula variables that includes Product opportunity size, Total opportunity size, Amount of time left to commit, Request age, Amount of time before product install date, and Cost sizing, the NORMALIZATION FACTOR values occurring in the component score formulas associated with the aforementioned second group of variables are associated with a plurality of normalization factors in a one-to-one correspondence, where the plurality of normalization factors are derived from normalization formulas 108 (see FIG. 1). Examples of normalization formulas 108 are presented below relative to FIG. 7.

The present invention contemplates other component score formulas that are equivalent to the component score formulas presented in table 500. For example, in the component score formula corresponding to the Product opportunity size variable, dividing by NORMALIZATION FACTOR can be replaced by multiplying by the reciprocal of NORMALIZATION FACTOR.

Further, the present invention contemplates other Yes and No values of the Opportunity lost if rejected and Strategic operating system variables besides the 1 and 0 values shown in the Comments/Conditions column of table 500.

EXAMPLE

Figure 6:
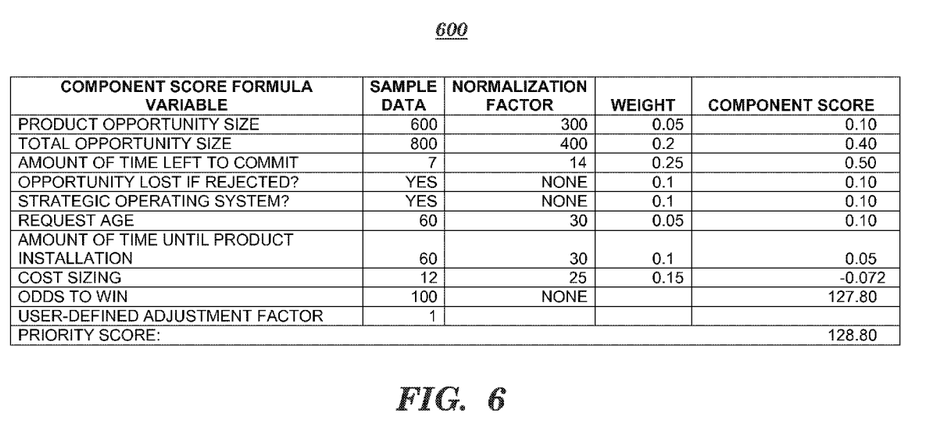
FIG. 6 is a table of sample data, normalization factors, weights and component scores used to determine a priority score in the process of FIG. 3, in accordance with embodiments of the present invention.

FIG. 6 is a table 600 of sample data, normalization factors, weights and component scores used to determine a priority score in the process of FIG. 3, in accordance with embodiments of the present invention. Sample data in the second column of table 600 is data for each of the component score formula variables in the first column of table 600. The component score formula variables in the first column of table 600 are discussed above relative to FIGS. 4 and 5. For example, the product opportunity size variable in the example of FIG. 6 is assigned a value of 600 (i.e., the 600 in the Sample data column). Sample normalization factors and sample weights used in the evaluation of the component score formulas of FIG. 5 are shown in the Normalization factor and Weight columns, respectively, of table 600. Finally, the Component score column of table 600 includes the component scores evaluated using the corresponding data from the Sample data, Normalization factor and Weight columns of table 600 in the associated component score formulas of FIG. 5.

In table 600, the sample data for the product opportunity size, total opportunity size and cost sizing variables are expressed in the same monetary unit (not shown). Similarly, the sample data in table 600 for the amount of time left to commit, request age, and amount of time until product installation variables are expressed in terms of the same time-based unit of measure (not shown).

The component scores of the Component score column of table 600 are evaluated as follows, using 1 to indicate Yes for the Opportunity lost if rejected and Strategic operating system variables:

Product opportunity size component score=(PRODUCT OPPORTUNITY SIZE/NORMALIZATION FACTOR)×WEIGHT=(600/300)× 0.05=0.10

Total opportunity size component score=(TOTAL OPPORTUNITY SIZE/NORMALIZATION FACTOR)×WEIGHT=(800/400)×0.2=0.40

Amount of time left to commit component score=(1/(AMOUNT OF TIME LEFT TO COMMIT/NORMALIZATION FACTOR))×WEIGHT=(1/(7/14))×0.25=0.50

Opportunity lost if rejected component score=OPPORTUNITY LOST IF REJECTED VALUE×WEIGHT=1×0.1=0.10

Strategic operating system component score=STRATEGIC OS VALUE×WEIGHT=1 ×0.1=0.10

Request age component score=(REQUEST AGE/NORMALIZATION FACTOR)×WEIGHT=60/ 30×0.05=0.10

Amount of time before product installation component score=(1/(AMOUNT OF TIME BEFORE PRODUCT INSTALLATION/NORMALIZATION FACTOR))×WEIGHT=(1/(60/30))× 0.1=0.05

Cost sizing component score=((COST SIZING/NORMALIZATION FACTOR)×WEIGHT)×(−1)= ((12/25)×0.15)×(−1)=−0.072

The sum of the evaluated component scores listed above is determined in step 306 (see FIG. 3). In the example of FIG. 6, the sum is 0.10+0.40+0.50+0.10+0.10+0.10+0.05+−0.072 (i.e., 1.278). The sum is then multiplied by the Odds to win value expressed as a percentage. That is, 1.278 is multiplied by 100 (i.e., the entry in the Sample data column of table 600 for the Odds to win variable) to determine an initial priority score of 127.80, which is shown in the last column of table 600 in the row corresponding to the Odds to win variable. Following the determination of the initial priority score in step 306 (see FIG. 3), the user-defined adjustment factor is added to the initial priority score to determine a final priority score. That is, the user-defined adjustment factor of 1 (i.e., the Sample data entry for the user-defined adjustment factor variable of table 600) is added to 127.80 to obtain the final priority score of 128.80, which is shown in the last column of table 600 in the row labeled Priority score.

Normalization Factors

Figure 7:
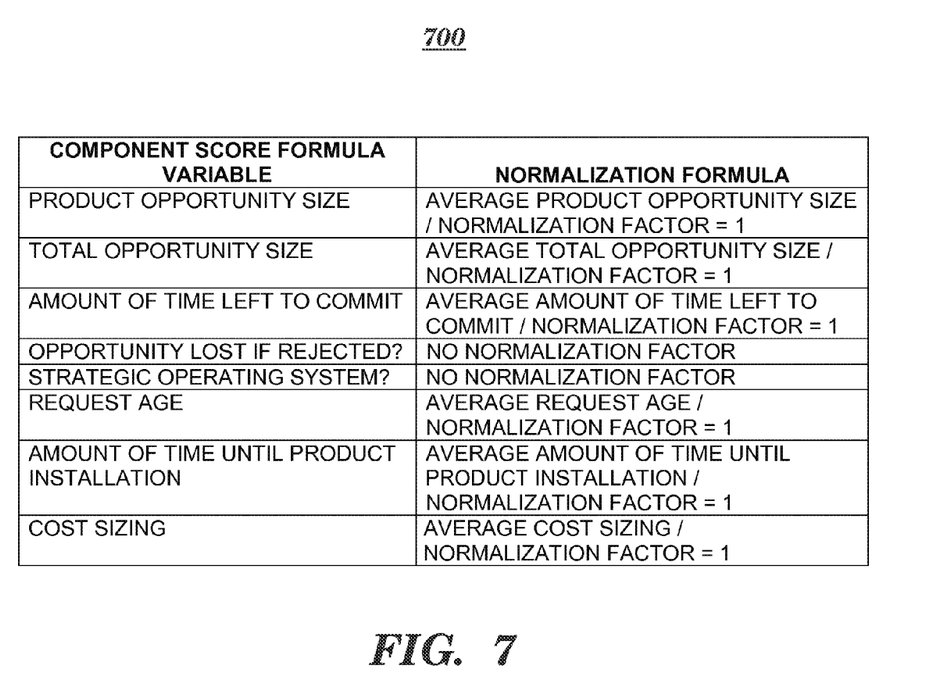
FIG. 7 is a table of normalization formulas used in the system of FIG. 1, in accordance with embodiments of the present invention.

FIG. 7 is a table 700 of normalization formulas used in the system of FIG. 1, in accordance with embodiments of the present invention. Table 700 includes examples of normalization formulas 108 (see FIG. 1). For instance, the normalization factor in the total opportunity size component score formula of (TOTAL OPPORTUNITY SIZE/NORMALIZATION FACTOR)×WEIGHT is determined by the normalization formula in the second column of table 700 that corresponds to the total opportunity size variable in the first column of table 700. That is, the normalization factor in the total opportunity size component score formula is determined from the formula AVERAGE TOTAL OPPORTUNITY SIZE/NORMALIZATION FACTOR=1.

Computing System

Figure 8:
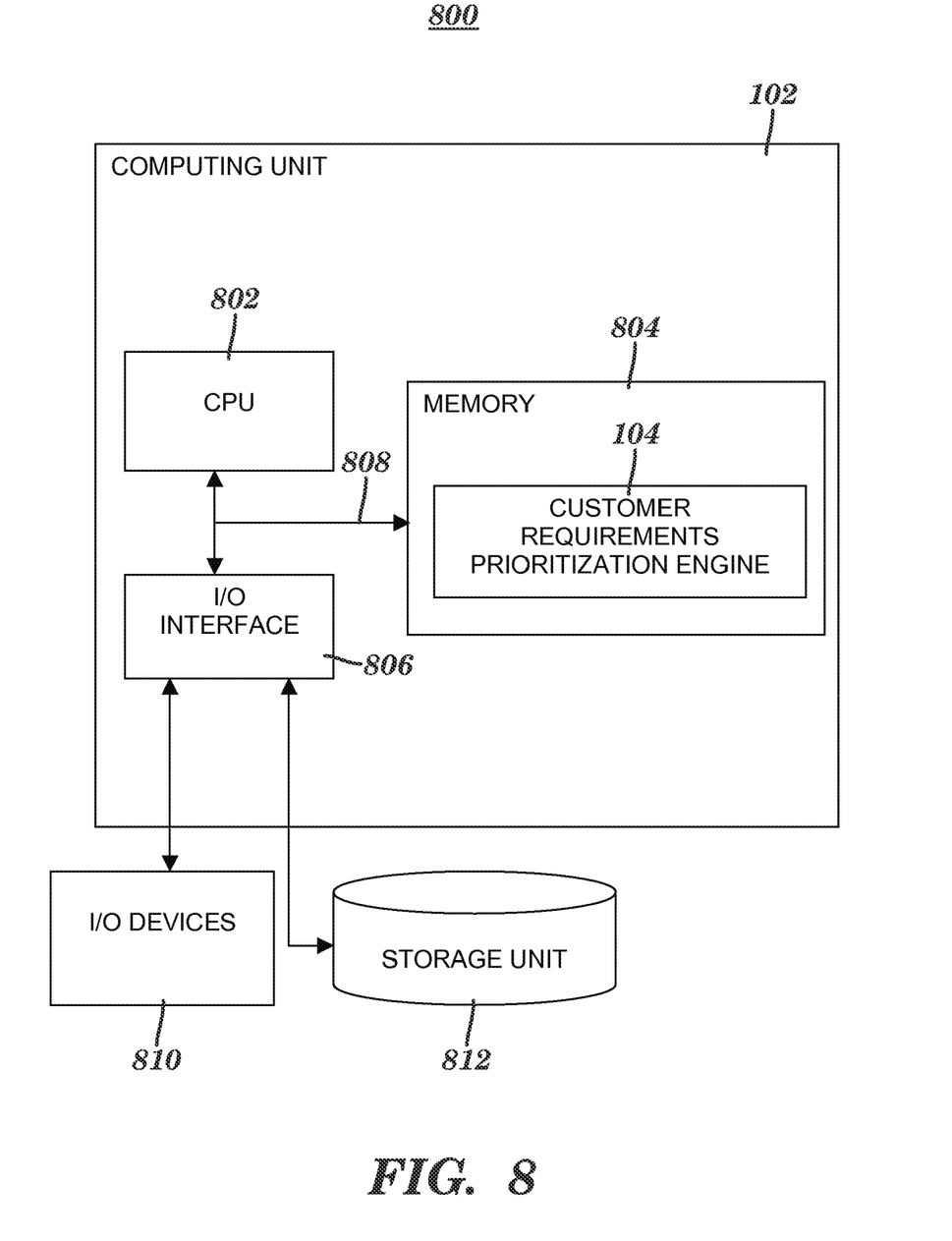
FIG. 8 is a block diagram of a computing system having a computing unit that is included in the system of FIG. 1 and that implements the operations of FIG. 2 and the process of FIG. 3, in accordance with embodiments of the present invention.

FIG. 8 is a block diagram of a computing system 800 having a computing unit 102 that is included in the system of FIG. 1 and that implements the operations of FIG. 2 and the process of FIG. 3, in accordance with embodiments of the present invention. Computing unit 102 generally comprises a central processing unit (CPU) 802, a memory 804, an input/output (I/O) interface 806, and a bus 808. Computing system 800 includes I/O devices 810 and a storage unit 812 coupled to computing unit 102. CPU 802 performs computation and control functions of computing unit 102. CPU 802 may comprise a single processing unit, or be distributed across one or more processing units in one or more locations (e.g., on a client and server).

Memory 804 may comprise any known type of data storage and/or transmission media, including bulk storage, magnetic media, optical media, random access memory (RAM), read-only memory (ROM), a data cache, a data object, etc. Cache memory elements of memory 804 provide temporary storage of at least some program code in order to reduce the number of times code must be retrieved from bulk storage during execution. Storage unit 812 is, for example, a magnetic disk drive or an optical disk drive that stores data. Moreover, similar to CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, handheld device, printer, facsimile, etc. Bus 808 provides a communication link between each of the components in computing unit 102, and may comprise any type of transmission link, including electrical, optical, wireless, etc.

I/O interface 806 also allows computing unit 102 to store and retrieve information (e.g., program instructions or data) from an auxiliary storage device (e.g., storage unit 812). The auxiliary storage device may be a non-volatile storage device (e.g., a CD-ROM drive which receives a CD-ROM disk). Computing unit 102 can store and retrieve information from other auxiliary storage devices (not shown), which can include a direct access storage device (DASD) (e.g., hard disk or floppy diskette), a magneto-optical disk drive, a tape drive, or a wireless communication device.

Memory 804 includes program code for customer requirements prioritization engine 104. Further, memory 804 may include other systems not shown in FIG. 8, such as an operating system (e.g., Linux) that runs on CPU 802 and provides control of various components within and/or connected to computing unit 102.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 104 for use by or in connection with a computing system 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the method of automatically prioritizing a plurality of customer requirements. Thus, the present invention discloses a process for supporting computer infrastructure, comprising integrating, hosting, maintaining and deploying computer-readable code into a computing system (e.g., computing system 800), wherein the code in combination with the computing unit is capable of performing a method of automatically prioritizing a plurality of customer requirements.

In another embodiment, the invention provides a business method that performs the process steps of the invention on a subscription, advertising and/or fee basis. That is, a service provider, such as a Solution Integrator, can offer to create, maintain, support, etc. a method of automatically prioritizing a plurality of customer requirements. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention. For example, the customer requirement prioritization system and process disclosed herein can be applied to a service desired by a customer, where customer requirements describe one or more modifications and/or one or more additions to the service.

What is claimed is:

1. A computer-implemented method of automatically prioritizing a plurality of customer requirements, comprising:
receiving, by a computing unit, said plurality of customer requirements including a customer requirement and one or more other customer requirements, said customer requirement specifying one or more modifications to a product;
obtaining, by said computing unit, a product opportunity size indicating an amount of revenue to be realized as a result of providing said product having said one or more modifications specified by said customer requirement, a total opportunity size indicating said product opportunity size and other revenue to be realized as a result of providing one or more secondary products based on a need for said product, a first amount of time remaining before a commitment to fulfill said customer requirement must be delivered to preserve an ability to fulfill said customer requirement, a second amount of time remaining before an installation of said product having said one or more modifications specified by said customer requirement, an age of a request for fulfilling said customer requirement, a first Boolean value indicating whether customization of an operating system of said product is required to fulfill said customer requirement, and a second Boolean value indicating whether said amount of revenue to be realized by providing said product having said one or more modifications specified by said customer requirement is lost if said request for fulfilling said customer requirement is rejected;
weighting, by said computing unit, said product opportunity size with a first weight, said total opportunity size with a second weight, said first amount of time with a third weight, said second amount of time with a fourth weight, said age of said request for fulfilling said customer requirement with a fifth weight, said first Boolean value with a sixth weight, and said second Boolean value with a seventh weight;
based on said weighted product opportunity size, said weighted total opportunity size, said weighted first amount of time, said weighted second amount of time, said weighted age of said request for fulfilling said customer requirement, said weighted first Boolean value, and said weighted second Boolean value, said computing unit automatically determining a first priority score for ranking said customer requirement among said plurality of customer requirements;
determining, by said computing unit, one or more other priority scores for ranking said one or more other customer requirements among said plurality of customer requirements;
determining, by said computing unit, said first priority score for ranking said customer requirement is greater than any priority score included in said one or more other priority scores;
automatically ranking, by said computing unit, said customer requirement higher than said one or more other customer requirements based on said first priority score determined to be greater than any priority score included in said one or more other priority scores; and based on said customer requirement being ranked higher than said one or more other customer requirements, assigning, by said computing unit, resources to fulfill said customer requirement instead of assigning said resources to fulfill another customer requirement of said one or more other customer requirements.

2. The method of claim 1, further comprising applying a first normalization factor to said product opportunity size, a second normalization factor to said total opportunity size, a third normalization factor to said first amount of time, a fourth normalization factor to said second amount of time, and a fifth normalization factor to said age of said request for fulfilling said customer requirement, wherein said applying said first through fifth normalization factors is performed prior to said weighting.

3. The method of claim 1, further comprising:
obtaining, by said computing unit, a cost sizing that indicates a cost of resources required for a test for fulfilling said customer requirement and a value indicating an odds of winning a bid for fulfilling said customer requirement; and
weighting, by said computing unit, said cost sizing with an eighth weight,
wherein said automatically determining said first priority score is further based on said weighted cost sizing and said value indicating said odds of winning said bid.

4. The method of claim 3, further comprising:
obtaining, by said computing unit, a user-defined adjustment factor; and
adjusting, by said computing unit, said first priority score by adding said user-defined adjustment factor to said first priority score, wherein said automatically ranking said customer requirement higher than said one or more other customer requirements is further based on said adjusted first priority score.

5. The method of claim 4, further comprising:
receiving, by said computing unit and subsequent to said automatically determining said first priority score, an update of said user-defined adjustment factor; and
dynamically and automatically determining, by said computing unit and in response to said receiving said update of said user-defined adjustment factor, an update of said first priority score based on said update of said user-defined adjustment factor;
determining a second priority score of said one or more other priority scores is greater than said update of said first priority score, wherein said second priority score is for ranking a second customer requirement of said one or more other customer requirements;
based on said second priority score being greater than said update of said first priority score, ranking, by said computing unit, said second customer requirement higher than said customer requirement; and
based on said second customer requirement being ranked higher than said customer requirement, reassigning, by said computing unit, said resources to fulfill said second customer requirement instead of said customer requirement.

6. The method of claim 1, further comprising:
receiving, by said computing unit and subsequent to said automatically determining said first priority score, a first update of a weight selected from the group consisting of: an update of said first weight, an update of said second weight, an update of said third weight, and update of said fourth weight, and update of said fifth weight, and update of said sixth weight, and an update of said seventh weight;
dynamically and automatically determining, by said computing unit and in response to said receiving said first update of said weight, an update of said first priority score based on said first update of said weight;
determining a second priority score of said one or more other priority scores is greater than said update of said first priority score, wherein said second priority score is for ranking a second customer requirement of said one or more other customer requirements;
based on said second priority score being greater than said update of said first priority score, ranking, by said computing unit, said second customer requirement higher than said customer requirement; and
based on said second customer requirement being ranked higher than said customer requirement, reassigning, by said computing unit, said resources to fulfill said second customer requirement instead of said customer requirement.

7. The method of claim 1, further comprising:
obtaining, by said computing unit, a cost sizing that indicates a cost of resources required for a test for fulfilling said customer requirement and a value indicating an odds of winning a bid for fulfilling said customer requirement;
weighting, by said computing unit, said cost sizing with an eighth weight, wherein said automatically determining said first priority score is further based on said weighted cost sizing and said value indicating said odds of winning said bid;
said computing unit normalizing said product opportunity size, said total opportunity size, said first amount of time, said second amount of time, said age of said request for fulfilling said customer requirement, and said cost sizing by first, second, third, fourth, fifth and sixth normalization factors, respectively;
said computing unit determining a first component score by dividing said product opportunity size by said first normalization factor to generate a first result and then multiplying the first result by said first weight;
said computing unit determining a second component score by dividing said total opportunity size by said second normalization factor to generate a second result and then multiplying said second result by said second weight;
said computing unit determining a third component score by dividing said first amount of time by said third normalization factor to generate a third result, and then multiplying said third weight by a reciprocal of said third result;
said computing unit determining a fourth component score by dividing said second amount of time by said fourth normalization factor to generate a fourth result, and then multiplying said fourth weight by a reciprocal of said fourth result;
said computing unit determining a fifth component score by dividing said age of said request by said fifth normalization factor to generate a fifth result, and then multiplying said fifth result by said fifth weight;
said computing unit determining a sixth component score by multiplying said sixth weight by one if said first Boolean value indicates that said customization of said operating system is required or by multiplying said sixth weight by zero if said first Boolean value indicates that said customization of said operating system is not required;

said computing unit determining a seventh component score by multiplying said seventh weight by one if said second Boolean value indicates that said amount of revenue to be realized by providing said product having said one or more modifications is lost if said request for fulfilling said customer requirement is rejected or multiplying said seventh weight by zero if said second Boolean value indicates that said amount of revenue to be realized by providing said product having said one or more modifications is not lost if said request for fulfilling said customer requirement is rejected; and said computing unit determining an eighth component score by dividing said cost sizing by said sixth normalization factor to generate said sixth result, then multiplying said sixth result by said eighth weight to generate a seventh result, and then multiplying said seventh result by −1, wherein said automatically determining said first priority score includes adding said first through eighth component scores to generate an eighth result, then multiplying said eighth result by said value indicating said odds of winning said bid for fulfilling said customer requirement to generate said first priority score.

8. A computer program product, comprising a computer-readable, tangible storage device coupled to a processor of a computer system, said storage device having computer-readable program code stored therein, said computer-readable program code containing instructions that are carried out by said processor to implement a method for automatically prioritizing a plurality of customer requirements, said method comprising:

receiving said plurality of customer requirements including a customer requirement and one or more other customer requirements, said customer requirement specifying one or more modifications to a product;

obtaining a product opportunity size indicating an amount of revenue to be realized as a result of providing said product having said one or more modifications specified by said customer requirement, a total opportunity size indicating said product opportunity size and other revenue to be realized as a result of providing one or more secondary products based on a need for said product, a first amount of time remaining before a commitment to fulfill said customer requirement must be delivered to preserve an ability to fulfill said customer requirement, a second amount of time remaining before an installation of said product having said one or more modifications specified by said customer requirement, an age of a request for fulfilling said customer requirement, a first Boolean value indicating whether customization of an operating system of said product is required to fulfill said customer requirement, and a second Boolean value indicating whether said amount of revenue to be realized by providing said product having said one or more modifications specified by said customer requirement is lost if said request for fulfilling said customer requirement is rejected;

weighting said product opportunity size with a first weight, said total opportunity size with a second weight, said first amount of time with a third weight, said second amount of time with a fourth weight, said age of said request for fulfilling said customer requirement with a fifth weight, based on said weighted product opportunity size, said weighted total opportunity size, said weighted first amount of time, said weighted second amount of time, said weighted age of said request for fulfilling said customer requirement, said weighted first Boolean value, and said weighted second Boolean value, automatically determining a first priority score for ranking said customer requirement among said plurality of customer requirements;

determining one or more other priority scores for ranking said one or more other customer requirements among said plurality of customer requirements;

determining said first priority score for ranking said customer requirement is greater than any priority score included in said one or more other priority scores;

automatically ranking said customer requirement higher than said one or more other customer requirements based on said first priority score determined to be greater than any priority score included in said one or more other priority scores; and based on said customer requirement being ranked higher than said one or more other customer requirements, assigning resources to fulfill said customer requirement instead of assigning said resources to fulfill another customer requirement of said one or more other customer requirements.

9. The program product of claim 8, wherein said method further comprises applying a first normalization factor to said product opportunity size, a second normalization factor to said total opportunity size, a third normalization factor to said first amount of time, a fourth normalization factor to said second amount of time, and a fifth normalization factor to said age of said request for fulfilling said customer requirement, wherein said applying said first through fifth normalization factors is performed prior to said weighting.

10. The program product of claim 8, wherein said method further comprises:

obtaining a cost sizing that indicates a cost of resources required for a test for fulfilling said customer requirement and a value indicating an odds of winning a bid for fulfilling said customer requirement; and weighting said cost sizing with an eighth weight, wherein said automatically determining said first priority score is further based on said weighted cost sizing and said value indicating said odds of winning said bid.

11. The program product of claim 10, wherein said method further comprises:

obtaining a user-defined adjustment factor; and adjusting said first priority score by adding said user-defined adjustment factor to said first priority score, wherein said automatically ranking said customer requirement higher than said one or more other customer requirements is further based on said adjusted first priority score.

12. The program product of claim 8, wherein said method further comprises:

obtaining a cost sizing that indicates a cost of resources required for a test for fulfilling said customer requirement and a value indicating an odds of winning a bid for fulfilling said customer requirement;

weighting said cost sizing with an eighth weight, wherein said automatically determining said first priority score is further based on said weighted cost sizing and said value indicating said odds of winning said bid;

normalizing said product opportunity size, said total opportunity size, said first amount of time, said second amount of time, said age of said request for fulfilling said customer requirement, and said cost sizing by first, second, third, fourth, fifth and sixth normalization factors, respectively;

determining a first component score by dividing said product opportunity size by said first normalization factor to generate a first result and then multiplying the first result by said first weight;

determining a second component score by dividing said total opportunity size by said second normalization factor to generate a second result and then multiplying said second result by said second weight;

determining a third component score by dividing said first amount of time by said third normalization factor to generate a third result, and then multiplying said third weight by a reciprocal of said third result;

determining a fourth component score by dividing said second amount of time by said fourth normalization factor to generate a fourth result, and then multiplying said fourth weight by a reciprocal of said fourth result;

determining a fifth component score by dividing said age of said request by said fifth normalization factor to generate a fifth result, and then multiplying said fifth result by said fifth weight;

determining a sixth component score by multiplying said sixth weight by one if said first Boolean value indicates that said customization of said operating system is required or by multiplying said sixth weight by zero if said first Boolean value indicates that said customization of said operating system is not required;

determining a seventh component score by multiplying said seventh weight by one if said second Boolean value indicates that said amount of revenue to be realized by providing said product having said one or more modifications is lost if said request for fulfilling said customer requirement is rejected or multiplying said seventh weight by zero if said second Boolean value indicates that said amount of revenue to be realized by providing said product having said one or more modifications is not lost if said request for fulfilling said customer requirement is rejected; and determining an eighth component score by dividing said cost sizing by said sixth normalization factor to generate said sixth result, then multiplying said sixth result by said eighth weight to generate a seventh result, and then multiplying said seventh result by −1;

wherein said automatically determining said first priority score includes adding said first through eighth component scores to generate an eighth result, then multiplying said eighth result by said value indicating said odds of winning said bid for fulfilling said customer requirement to generate said first priority score.

13. A process for supporting computing infrastructure, said process comprising providing at least one support service for at least one of creating, integrating, hosting, maintaining, and deploying computer-readable code in a computer comprising a central processing unit (CPU), wherein said CPU carries out instructions included in said code causing said computer to perform a method of automatically prioritizing a plurality of customer requirements, said method comprising:

receiving said plurality of customer requirements including a customer requirement and one or more other customer requirements, said customer requirement specifying one or more modifications to a product;

obtaining a product opportunity size indicating an amount of revenue to be realized as a result of providing said product having said one or more modifications specified by said customer requirement, a total opportunity size indicating said product opportunity size and other revenue to be realized as a result of providing one or more secondary products based on a need for said product, a first amount of time remaining before a commitment to fulfill said customer requirement must be delivered to preserve an ability to fulfill said customer requirement, a second amount of time remaining before an installation of said product having said one or more modifications specified by said customer requirement, an age of a request for fulfilling said customer requirement, a first Boolean value indicating whether customization of an operating system of said product is required to fulfill said customer requirement, and a second Boolean value indicating whether said amount of revenue to be realized by providing said product having said one or more modifications specified by said customer requirement is lost if said request for fulfilling said customer requirement is rejected;

weighting said product opportunity size with a first weight, said total opportunity size with a second weight, said first amount of time with a third weight, said second amount of time with a fourth weight, said age of said request for fulfilling said customer requirement with a fifth weight, said first Boolean value with a sixth weight, and said second Boolean value with a seventh weight;

based on said weighted product opportunity size, said weighted total opportunity size, said weighted first amount of time, said weighted second amount of time, said weighted age of said request for fulfilling said customer requirement, said weighted first Boolean value, and said weighted second Boolean value, automatically determining a first priority score for ranking said customer requirement among said plurality of customer requirements;;

determining one or more other priority scores for ranking said one or more other customer requirements among said plurality of customer requirements;

determining said first priority score for ranking said customer requirement is greater than any priority score included in said one or more other priority scores;

automatically ranking said customer requirement higher than said one or more other customer requirements based on said first priority score determined to be greater than any priority score included in said one or more other priority scores; and based on said customer requirement being ranked higher than said one or more other customer requirements, assigning resources to fulfill said customer requirement instead of assigning said resources to fulfill another customer requirement of said one or more other customer requirements.

14. The process of claim 13, wherein said method further comprises:

obtaining a cost sizing that indicates a cost of resources required for a test for fulfilling said customer requirement and a value indicating an odds of winning a bid for fulfilling said customer requirement;

weighting said cost sizing with an eighth weight, wherein said automatically determining said first priority score is further based on said weighted cost sizing and said value indicating said odds of winning said bid;

normalizing said product opportunity size, said total opportunity size, said first amount of time, said second amount of time, said age of said request for fulfilling said customer requirement, and said cost sizing by first, second, third, fourth, fifth and sixth normalization factors, respectively;

determining a first component score by dividing said product opportunity size by said first normalization factor to generate a first result and then multiplying the first result by said first weight;

determining a second component score by dividing said total opportunity size by said second normalization factor to generate a second result and then multiplying said second result by said second weight;

determining a third component score by dividing said first amount of time by said third normalization factor to generate a third result, and then multiplying said third weight by a reciprocal of said third result;

determining a fourth component score by dividing said second amount of time by said fourth normalization factor to generate a fourth result, and then multiplying said fourth weight by a reciprocal of said fourth result;

determining a fifth component score by dividing said age of said request by said fifth normalization factor to generate a fifth result, and then multiplying said fifth result by said fifth weight;

determining a sixth component score by multiplying said sixth weight by one if said first Boolean value indicates that said customization of said operating system is required or by multiplying said sixth weight by zero if said first Boolean value indicates that said customization of said operating system is not required;

determining a seventh component score by multiplying said seventh weight by one if said second Boolean value indicates that said amount of revenue to be realized by providing said product having said one or more modifications is lost if said request for fulfilling said customer requirement is rejected or multiplying said seventh weight by zero if said second Boolean value indicates that said amount of revenue to be realized by providing said product having said one or more modifications is not lost if said request for fulfilling said customer requirement is rejected; and determining an eighth component score by dividing said cost sizing by said sixth normalization factor to generate said sixth result, then multiplying said sixth result by said eighth weight to generate a seventh result, and then multiplying said seventh result by −1, wherein said automatically determining said first priority score includes adding said first through eighth component scores to generate an eighth result, then multiplying said eighth result by said value indicating said odds of winning said bid for fulfilling said customer requirement to generate said first priority score.

* * * * *